Jan. 1, 1924.
W. SPARKS
LIGHT ABSORBER FOR CAMERAS
Filed April 18, 1922
1,479,112
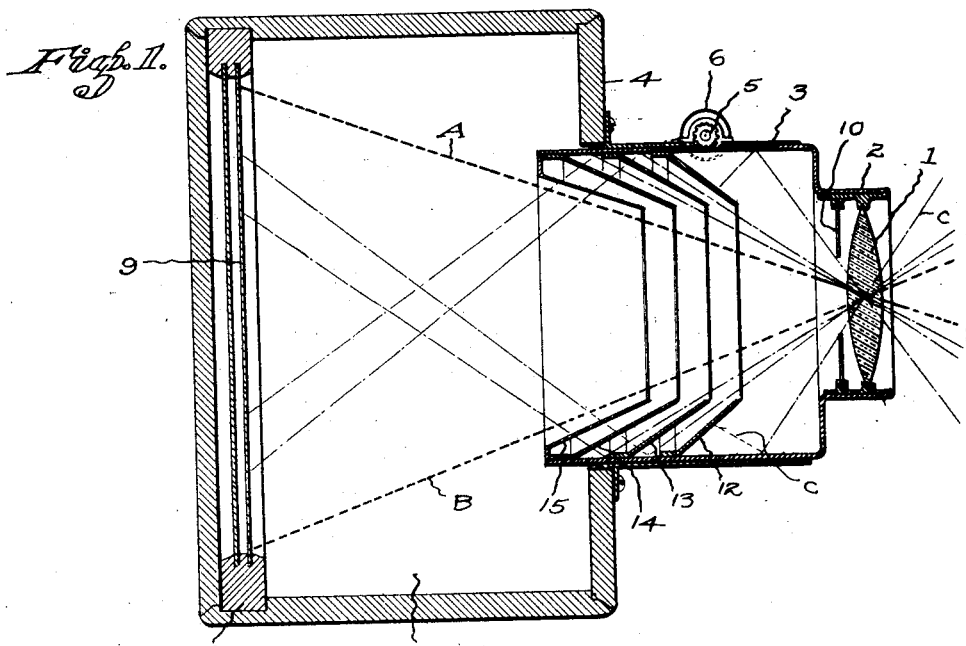
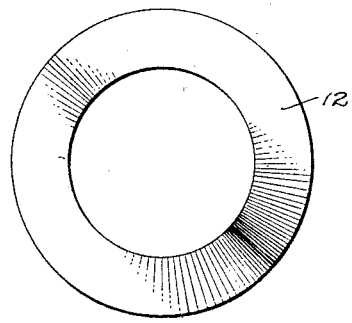
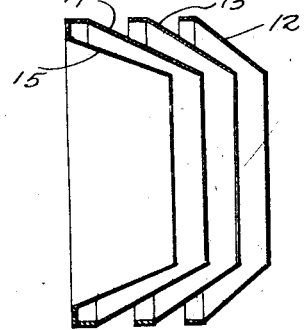
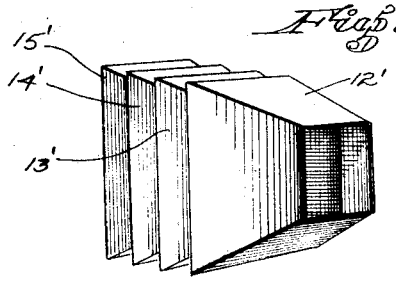
INVENTOR
*Will Sparks*
BY
ATTORNEY Patented Jan. 1, 1924.

1,479,112

UNITED STATES PATENT OFFICE.

WILL SPARKS, OF SAN FRANCISCO, CALIFORNIA, ASSIGNOR TO THE LIGHT-ABSORBER CAMERA COMPANY, OF SAN FRANCISCO, CALIFORNIA, A CORPORATION OF CALIFORNIA.

LIGHT ABSORBER FOR CAMERAS.

Application filed April 18, 1922. Serial No. 555,353.

*To all whom it may concern:*

Be it known that I, WILL SPARKS, a citizen of the United States, and a resident of the city and county of San Francisco, State of California, have made a new and useful invention, to wit, Improvements in Light Absorbers for Cameras; and I do hereby declare the following to be a full, clear, concise, and exact description of the same.

The invention relates particularly to means for arresting, impounding and absorbing indirect light rays in cameras, with the object of preventing flare, veiling or fogging of the photographic plate by indirect rays of light reflected or cross reflected within the camera. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In photography the image of the object projected on a photographic plate in proper proportion is sharper in definition and shows greater depth in area immediately surrounding the axis of the lens, which is the focal point on the photographic plate. Owing to the mechanical construction of the lens, these desirable qualities diminish as the outer margin of the plate is reached, due to mechanical and optical aberrations created by the lens. The greater the covering power of the lens, the larger the area surrounding the focal axis within which the image is most true. Therefore, a lens with great covering power or breadth of angle is desirable for covering sensitive plates even of small area such as motion picture films or the like. A lens of this large covering power has its power all the time, and if a large plate is not presented to it, the margins of its field fall upon and light the inside of the camera. Some of this indirect light is scattered onto the plate and tends to veil the negative, making it necessary to stop down the lens, which destroys much of its speed and illumination.

By the use of this invention the maximum illumination speed, definition and true proportion of the image projected by such a lens can be reproduced upon a sensitive plate of relatively diminutive size compared with the covering capacity of the lens. This is accomplished by arresting, impounding and absorbing the indirect rays of light inside the camera between the lens and the sensitive plate.

In the accompanying one sheet of drawings:

Fig. 1 is a drammatic representation of a photographic camera in cross section, having this invention applied thereto.

Fig. 2 is an end elevation of the nested septums detached from the lens mounting.

Fig. 3 is a side view of the same in cross section.

Fig. 4 is a perspective view of a modification of the septum.

In detail the construction illustrated in the drawings includes: the lens 1 of any conventional construction, in a suitable mounting 2, slidably adjustable within the housing 3 fixed to the front board 4 of the camera box in any suitable manner. The tubular lens mounting 2 is adjusted within the housing 3 by the pinion 5 engaging rack teeth formed in the housing 2, the pinion being rotated by the knurled handle 6, in the usual manner. The camera consists of the conventional light tight box 7, having a plate holder 8 slidable therein and containing a sensitive plate 9 in proper focal relation to the lens 1, which is provided with the usual stop 10 proportioned to the focal distance between the lens and the plate, all of which construction is conventional and diagrammatically illustrated and is not to be construed as limiting this invention, which is applicable to every form of photography involving a lens or illuminating aperture and a photographic sensitive surface such as a plate or film.

In Fig. 1 the heavy black dotted lines A and B, crossing at the axis of the lens represent the lateral breadth of the cone of light rays conveying the image of the object to be photographed to the full area of the plate 9 exposed thereto. Presuming the lens 1 to have capacity for covering a plate many times the area of the plate 9, it is obvious that many of the lateral rays, represented by light dotted lines crossing at the axis of the lens, will enter and illuminate the interior of the camera without falling directly upon the exposed plate. Inasmuch as only the direct rays of light can convey a true image to the plate, these lateral or excess rays striking the interior surfaces of the camera or the lens mounting will be reflected therefrom, each at an angle equal to its angle of incidence which will project them across the main rays A and B onto the lateral margins of the sensitive plate 9, whereon they will impress their indirect images causing a confusion of images, resulting in what is variously described as flare, fog and veiling. It is on account of this scatter of light from even the blackest camera interior, that a lens, the field of which falls sharply off altogether, such as a portrait lens and some anastigmats, effort is made to minimize the fogging by using a camera several times larger than necessary for the plate area exposed, the whole image then falling at the end of the camera facing the lens without serious reflection of light. This is obviously an impractical expedient not fully effective at best.

The means I prefer in accomplishing the objects of this invention and obviating the disadvantages set forth, include a series of septums, such as 12, 13, 14 and 15, interspaced and arranged concentrically within the lens mounting and directed substantially parallel with the rays of light passing through the lens, in accordance with their distance from the lens. The last septum 15 being arranged in proximity to the cone formed by the angle A and B, the true image passes unobstructed from the lens to the base of the cone illuminating the plate 9. These septums are of suitable opaque material, preferably painted dull black or coated with any suitable light absorbing substance. The light rays projected at angles lateral to the cone A—B are directed into the spaces or cells between these septums, wherein they are impounded or absorbed or prevented from reflecting on lines such as indicated by the dot and dash lines, which would cause the flare or fogging of the plate if the septums were not present to intersect them. In a relatively short focus lens, one septum may be sufficient. However, in a long focus lens conditions such as indicated in Fig. 1 are improved by a multiplicity or duplication of the septums as shown, by which means all wide angle rays, such as C—C are intercepted and killed and a node of darkness created around the direct cone of light. The operation of this invention is not to be confused with more light absorbing surfaces or dulled finish, but comprehends a cellular structure capable of impounding the light and interposing an opaque obstruction to the passage of reflected rays of light.

Back reflection between the surface of the plate and the lens and back to the plate is eliminated or minimized by the presence of the septums.

Because illumination passed through a lens takes the form of a cone of light, the septums are preferably made in the form of frustrums of cones. However, the septums can take the shape of the lens mounting or interior of the camera, whether it be square, pyramidal, or any regular or irregular shape, requiring a consistent modification of the septums, as in Fig. 4 where the septums are designated by the characters 12′, 13′, 14′ and 15′.

Having thus described this invention, what I claim and desire to secure by Letters Patent is:

1. In a photographic camera means intermediate the lens and the plate thereof and tapering toward the axis of the lens for preventing all but direct light rays reaching said plate.

2. In a photographic camera having an aperture and a plate; cellular means within said camera coaxially with and tapering toward said aperture adapted to absorb all light rays not directly projected upon said plate through said aperture.

3. In a photographic camera having a plate and an aperture adapted to direct a cone of light onto said plate; opaque septums interposed between the light rays within said camera outside of said cone of light coaxially with and tapering toward said aperture.

4. In combination with a lens and mounting; a septum in said mounting arranged coaxially with and tapering toward said lens, the angle of taper of said septum approximating the angle of projection of the light ray projected toward it by said lens.

5. In combination with a lens and mounting; interspaced septums in said mounting, directed toward the center and spaced back from said lens.

6. In combination with a lens and mounting; interspaced tubular septums arranged in said mounting coaxially with and tapering toward said lens, the angle of taper of each septum approximating the angle of projection of the light ray projected toward it by said lens.

In testimony whereof, I have hereunto set my hand at San Francisco, California, this 27th day of January, 1922.

WILL SPARKS.

In presence of—
LINCOLN V. JOHNSON.